United States Patent [19]

Kaufmann et al.

[11] Patent Number: 4,492,432
[45] Date of Patent: Jan. 8, 1985

[54] HOMEOTROPIC NEMATIC DISPLAY WITH INTERNAL REFLECTOR

[75] Inventors: Meinolph Kaufmann, Rütihof-Baden; Hanspeter Schad, Rieden, both of Fed. Rep. of Germany

[73] Assignee: BBC Brown, Boveri & Company, Limited, Baden, Switzerland

[21] Appl. No.: 283,175

[22] Filed: Jul. 14, 1981

[30] Foreign Application Priority Data

Jul. 28, 1980 [CH] Switzerland ............... 5753/80

[51] Int. Cl.³ .............................. G02F 1/133
[52] U.S. Cl. ....................................... 350/338
[58] Field of Search ............ 350/338, 347 R, 347 V, 350/339 R, 345, 288, 320, 350 R

[56] References Cited

U.S. PATENT DOCUMENTS

| | | | |
|---|---|---|---|
| 4,032,218 | 6/1977 | Scheffer | 350/347 R X |
| 4,116,544 | 9/1978 | Soref | 350/337 X |
| 4,150,878 | 4/1979 | Barzilai et al. | 350/344 |
| 4,217,035 | 8/1980 | Doriguzzi et al. | 350/344 X |
| 4,340,277 | 7/1982 | Kaufmann et al. | 350/337 X |
| 4,357,374 | 11/1982 | Ogawa | 350/340 X |

OTHER PUBLICATIONS

Guyon et al., "Anchoring Properties and Alignment of Liquid Crystals", *Nonemissive Electrooptic Display*, Paris 1975, pp. 121–144.

Maltese et al., "Improved Construction of Liquid Crystal Display Cells", *Alta Frquenza*, vol. XLVII, No. 9, Sep. 1978, pp. 664–667.

Kahn, "Orientation of Liquid Crystals by Surface Coupling Agents", *App. Phys. Lett.*, vol. 22, No. 8, Apr. 15, 1978, pp. 386–388.

White et al., "New Aborptive Mode Reflective Liquid Crystal Display Device", *J. of Appl. Phys.*, vol. 45, No. 11, Nov. 1974, American Institute of Technology, pp. 4718–4723.

Demus, "Chemical Composition and Display Performance", *Nonemissive Electrooptic Displays*, Ed. Kmetz et al., Plenum Press, New York, 1976, pp. 83–119.

*Primary Examiner*—John K. Corbin
*Assistant Examiner*—David Lewis
*Attorney, Agent, or Firm*—Oblon, Fisher, Spivak, McClelland & Maier

[57] ABSTRACT

Nematic liquid crystal display is provided with front side polarizer (13) and homeotropic orientation in the non-field state. The nematic liquid crystal (6) has a negative dielectric anisotropy.

The display cell has an internal reflector (11) consisting of an insulating oxide layer with built-in aluminum flakes and a front side polarizer (8, 13). This display provides a reflection display with no back lighting.

6 Claims, 1 Drawing Figure

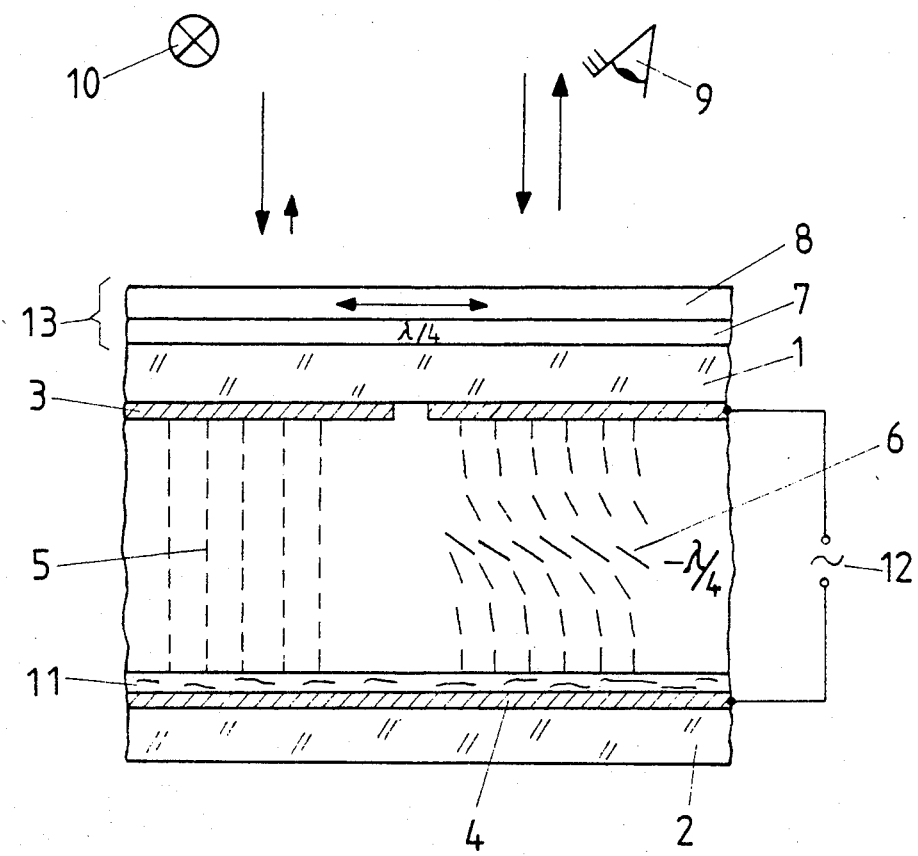

HOMEOTROPIC NEMATIC DISPLAY WITH INTERNAL REFLECTOR

BACKGROUND OF THE INVENTION

1. Field of the Invention

The invention concerns a liquid crystal display.

2. Description of the Prior Art

According to P. Maltese and C. M. Ottavi (Alta Frequenza, Vol. 47, No. 9, 1978) a nematic field effect liquid crystal display with negative anisotropy of the dielectric constants and homeotropic orientation to the boundary is known that has a right or left circular polar polarizer in front of and a left one behind the liquid crystal cell.

From the French patent document No. 2 201 005 of the same inventors a liquid crystal display with negative dielectric anisotropy and homeotropic orientation of the liquid crystal is known. The liquid crystal is located between two carrier plates, of which at least one is transparent. The thickness of the liquid crystal layer is chosen as close as possible to its optimum specific thickness. This thickness is normally not larger than 5 $\mu$m. The display is activated in transmission. The display can, however, also be used in reflection operation. For this purpose electrode 8 is at the same time a metallic mirror. It is not mentioned from what material this mirror should be made. In this arrangement only a polarizer is needed. In order to achieve an orientation of the liquid crystal the contact surfaces of the liquid crystal cell are first cleaned with a mixture of sulfuric acid and chromic acid and then rinsed with distilled water. Subsequently these surfaces are rubbed with a chamois and scouring powder in a specific direction.

For this effect very narrow (3–10 $\mu$m) cell intervals as parallel in plane as possible are needed. Since up to now this requirement for a small variation in the thickness of the intervals could only be achieved through thick glass plates, operation with an external reflector involved a strong parallax. An internal reflector, as is known from the literature above, has the disadvantage that the display element is visible even when the power is not turned on. If the same liquid crystal layer is used as in transmission operation, i.e. MBBA, IEBBA mixture, the layer is about 2 $\mu$m thick. Such thin layers cannot be achieved at present.

SUMMARY OF THE INVENTION

Accordingly one object of the present invention is to improve a liquid crystal display of the type initially cited in such a way that it eliminates any parallax with a large viewing angle and has a high multiplex capability and substantially reduces the switching times in comparison with transmission operation.

If an internal reflector and a polarizer are used in accordance with the invention only on the front cell plate of the nematic liquid crystal cell, the following additional advantages are achieved in comparison with transmission operation and reflection operation with an external reflector or internal reflector that is at the same time the rear electrode:

The liquid crystal cell can be operated with a liquid crystal layer only half as thick. The temperature dependency of the voltage contrast line is decreased. The thickness control of the liquid crystal layer is possible at less cost, since the rear cell plate can be very thick. A supplementary external light source is not needed. The electrode segment of the display is then not visible when the power is off.

A linear polarizer allows the liquid crystal display in accordance with the present invention to be operated with positive contrast, i.e. dark figures on a light background.

When a circular polarizer is used with the liquid crystal display of the present invention, a clear presentation of light figures on a dark background is possible. Dirt and scratches, which arise from the use of a linear polarizer, because the inner upper surfaces of the cell plates 1 and 2 are handled and which slightly affect the clarity of the image are no longer visible.

The upper surfaces of cell plates 1 and 2, which are first rubbed and then coated with silane, produce an orientation of the liquid crystal's preferred axis that is tipped about 1° to the normal. Through this a similar tipping is achieved when the field is switched on (application of a current).

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein there is shown a schematic drawing of the liquid crystal display of the present invention:

DETAILED DESCRIPTION OF THE PREFERRED EMBODIMENT

According to the FIGURE two parallel cell plates 1 and 2 made of glass, for example, located at a specific distance, e.g. 5 $\mu$m, from one another form a cell. On the surfaces facing one another they are coated with a front transparent electrode layer 3 and a rear not necessarily transparent electrode layer 4 made of tin dioxide, which is applied by vaporization or sputtering. An alternating current source 12 is connected to the electrode layers 3 and 4. A standard commercial circular polarizer 13 is placed on that surface of the front cell plate 11 which is turned away from the cell. This consists of a quarter wave plate 7 and a linear polarizer 8 fastened to it in the form of a polarizer film.

The rear electrode layer 4 is covered with an internal reflector by means of screen printing. Such an internal reflector is described, e.g., in the DE-OS No. 26 29 765. It has the advantage of consisting of an insulating oxide layer, e.g. of $CeO_2$, $MgO$, $SiO_2$, $TiO$, $TiO_2$, $ZrO_2$, $Al_2O_3$ or $Gd_2O_3$, with built-in reflecting aluminum flakes. The aluminum flakes have a length of 2 to 10 $\mu$m.

The cell plates 1 and 2 enclose a layer of the nematic liquid crystal 5 and 6 between them. The double refraction anisotropy of the liquid crystal should lie between 0.04 and 0.15. For this reason LIXON (Registered Trademark for liquid crystal) EN-18, which can be obtained from the firm Chisso, Japan, is used as the liquid crystal substance. The surface of the front electrode layer 3 and/or the oxide layer of the internal reflector 11 are treated through rubbing and subsequent coating with silane. Procedures of this sort are described, e.g., in the publication of F. J. Kahn in *Appl. Phys. Letters*, Vol. 22, No. 8 (1973), pp. 386–388. For the homeotropic orientation of the liquid crystal 5 DMOAP=N,N-dimethyl-N-octa-decyl-3-aminopropyltrimenthoxysilylchloride is used.

On the left side of the FIGURE the liquid crystal 5 is in a non-field state. The preferred axes of the liquid crystal 5 are perpendicular or nearly perpendicular, e.g. with a tipping angle of ca. 1°, to the surface of the front and rear cell plates 1 and 2.

On the right side of the FIGURE the liquid crystal 6 is subject to the influence of an electric field. The preferred axes show a tipping that increases in steps going out from the cell plates 1 and 2 to the middle of the cell up to the maximum tipping angle there of not quite 90° to the direction of the electric field. The symbols designated with 9 and 10 in the FIGURE represent the viewer and the light source, respectively.

The method of operation is as follows:

After circular polarization by the polarizer 13 light coming from the light source 10 passes through the glass plate 1 and the transparent front electrode layer 3 into the cell. Because of the approximate parallelism of the direction of incidence of the light and the optical axis of the liquid crystal 6 no double refraction occurs. The liquid crystal 6 has no influence on the direction of rotation of the circularly polarized light and passes through the liquid crystal 6 undisturbed. After reflection from the internal reflector 11 the light as seen by the viewer 9 is circularly polarized in the opposite direction to the incoming light (reflection from the denser medium—phase shift of $\pi$). Therefore it cannot pass through the polarizer 13 because of the opposite direction of rotation. The viewer 9 sees an area that is uniformly dark.

When the field is turned on one obtains through the electrical field a tipping of the preferred axes that increases by steps in a direction parallel to the cell walls and in fact going out from the opposite cell walls up to a maximum value of the tipping angle perpendicular to the surface of the cell plates 1 and 2 in the middle area of the cell (typically 70°–89°). The tipping of the optical axis eliminates the circular polarization in the case of optimal contrast. The viewer 9 sees light figures on a dark background.

It is also possible to operate the liquid crystal display with positive contrast, i.e. showing dark figures on a light background. This can be achieved by using only the linear polarizer 8 without the quarter wave plate 7. Again there is no double refraction when the field is off, i.e. no splitting of the incoming linearly polarized light into a ordinary and an extraordinary beam, since the optical axis of the liquid crystal 6 is approximately parallel to the direction of incidence of the light. The observer 9 sees a uniformly light area.

When the field is turned on, the optical axis of the liquid crystal 6 is approximately perpendicular to the direction of incidence and tipped about 45 to the direction of polarization of the light. As a result of double refraction the incoming light is now split into an extraordinary and an ordinary beam of equal intensity. The ordinary and extraordinary beams have a phase difference of $\lambda/4$ after passing up to the internal reflector 11 and after reflection and again passing through the liquid crystal layer on the linear polarizer 8 they have a phase difference of $\lambda/2$, which is equivalent to a 90° rotation of the polarization direction.

The reflected light thus cannot pass through the polarizer 8. The viewer 9 sees dark figures on a light background.

The liquid crystal display in accordance with the invention is distinguished by high multiplex capability. The optimal thickness of the layers of the liquid crystals 5 and 6 is for EN-18 only half as large (~5 $\mu$m) in comparison with transmission operation. This characteristic reduces the switching times to a quarter of the values for transmission operation and improves the angle characteristic, the range of viewing angles in which the display still has good contrast, ca. ±45°. In addition, comparison of reflective with transmission display systems shows that the temperature dependency of the voltage-contrast curve is less for the reflective type.

Measurements in the temperature range from 20° to 50° with the incidence of white circularly polarized light gave the following results:

$$U_{threshold}(V) = -3.4 \cdot 10^{-4} \left(\frac{1}{°C.}\right) \quad t(°C.) = 1.52 \pm 1\%$$

The ratio of control voltage to the threshold voltage at 50% saturation contrast was 1.15+2%. When the liquid crystal display was used in multiplex operation with a variable multiplex degree in 3:1 amplitude selection with $U_{threshold}$=the quadratic mean value of the control voltage in a non-field state=1.40 V at 22° the following contrast ratios were shown:

| Multiplex degree | 7 | 10 | 20 |
|---|---|---|---|
| Contrast | 9:1 | 7:1 | 4:1 |

When the liquid crystal display is operated with the upper voltage value $U_{threshold}$ of 1.4×3=4.2 the control can take place with both C-MOS and TTL techniques. The achievable multiplex degree of 3:1 amplitude selection can be about doubled with equal contrast through an optimal control procedure, i.e. a multiplex degree of 40 can be achieved with a contrast of 4:1. The optimal control procedure is described in detail in *IEEE Transactions on Electro-Devices*, Vol. ED-21, No. 2, February 1974, pp. 146–155 by P. M. Alt and P. Pleshko and in *IEEE Transactions on Electro-Devices*, Vol. ED-26, No. 5, May 1979, pp. 795–802 by J. Nehring and A. R. Kmetz. The TTL compatibility, however, is lost here. The measurement of the switching times at a multiplex degree of 7 gave the following values:

| Switch-on time: | 180 ms. |
|---|---|
| Switch-off time: | 150 ms. |

The temperature dependency of the curve data in the range of 20° to 50° is so small that no voltage correction of the driver is needed up to multiplex degree 20 (3:1 amplitude selection).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A liquid crystal display comprising:
   a cell consisting of two plane-parallel plates with a maximal cell thickness of 6 microns;
   a pair of electrode layers on the inner surfaces of said two plane-parallel plates wherein at least one of said electrode layers is transparent;
   a nematic liquid crystal having a negative dielectric anisotropy and a double refraction anisotropy between 0.04 and 0.15 and having rubbed orientational surfaces of said two plane-parallel plates to give the nematic liquid crystal a homeotropic orientation, wherein said rubbed orientational surfaces are treated with silane after rubbing;

an internal reflector mounted on one of said electrode layers and consisting of aluminum flakes and an insulating oxide layer with said aluminum flakes embedded therein;

a polarizer mounted on one of said two plane-parallel plates.

2. Liquid crystal display according to claim 1 wherein said insulating oxide layer consists of: $CeO_2$, $MgO$, $SiO_2$, $TiO$, $TiO_2$, $ZrO_2$, $Al_2O_3$ or $Gd_2O_3$.

3. Liquid crystal display according to claim 1 wherein said silane used to orient the liquid crystal molecular is DMOAP.

4. Liquid crystal display according to claim 1 wherein said aluminum flakes are 2 to 10 μm long.

5. Liquid crystal display according to claim 1 wherein said polarizer is a linear polarizer.

6. Liquid crystal display according to claim 1 wherein said polarizer is a circular polarizer.

* * * * *